(12) United States Patent
Nerad et al.

(10) Patent No.: US 7,341,621 B2
(45) Date of Patent: Mar. 11, 2008

(54) INK SET AND INK JET RECORDING METHOD

(75) Inventors: Bruce A. Nerad, Oakdale, MN (US); Richard L. Rosenberg, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 141 days.

(21) Appl. No.: 11/076,885

(22) Filed: Mar. 10, 2005

(65) Prior Publication Data

US 2006/0203058 A1 Sep. 14, 2006

(51) Int. Cl.
C09D 11/02 (2006.01)

(52) U.S. Cl. .................... 106/31.27; 106/31.6

(58) Field of Classification Search ............. 106/31.27, 106/31.6
See application file for complete search history.

(56) References Cited

U.S. PATENT DOCUMENTS

| | | | |
|---|---|---|---|
| 5,851,273 A | 12/1998 | Morris et al. | |
| 6,336,721 B1 | 1/2002 | Provost et al. | |
| 6,459,501 B1 | 10/2002 | Holmes | |
| 6,511,169 B1 | 1/2003 | Gallo et al. | |
| 6,511,170 B1 | 1/2003 | Gallo et al. | |
| 6,670,409 B2 * | 12/2003 | Yatake | 523/160 |
| 6,685,768 B2 | 2/2004 | Blease et al. | |
| 6,706,102 B2 | 3/2004 | Blease et al. | |
| 6,877,851 B2 * | 4/2005 | Watanabe | 347/100 |
| 6,923,854 B2 * | 8/2005 | Taguchi et al. | 106/31.43 |
| 6,924,327 B2 * | 8/2005 | Sano et al. | 523/160 |
| 2003/0150354 A1 | 8/2003 | Ito et al. | |
| 2004/0021733 A1 | 2/2004 | Lowndes | |
| 2004/0048745 A1 | 3/2004 | Kitamura et al. | |

FOREIGN PATENT DOCUMENTS

| | | |
|---|---|---|
| EP | 0 985 716 A | 3/2000 |
| EP | 1 172 422 A | 1/2002 |
| WO | WO 2004/050778 A | 6/2004 |

OTHER PUBLICATIONS

Shaw, et al., "Smooth Blending of Two Inks of Similar Hue to Simulate One Ink", *SPIE*- vol. 5667 (2005) pp. 409-416.
"HP Vivera Ink Technology Backgrounder", Sep. 2004.

* cited by examiner

*Primary Examiner*—J. A. Lorengo
*Assistant Examiner*—Veronica Faison-Gee
(74) *Attorney, Agent, or Firm*—Colene H. Blank

(57) ABSTRACT

An ink set is disclosed that comprises a first ink composition containing a first colorant, and a second ink composition containing a second colorant, wherein the first colorant is different from the second colorant; wherein each ink composition, when printed at 100% fill on the same substrate, produces a color having a hue angle, $h°_n$, and a lightness relative to that of the substrate, $\Delta L^*_n$, according to:

$$h°_n = \tan^{-1}(b^*_n/a^*_n)$$

$$\Delta L^*_n = L^*_{substrate} - L^*_n$$

wherein n=1 or 2 for the first and second ink compositions, respectively; $h°_1$ and $h°_2$ differ from each other by no more than 15°; and $\Delta L^*_1 > \Delta L^*_2$. An ink jet printing method that employs the ink set is also disclosed, as well as a printed image prepared with the ink set.

25 Claims, 1 Drawing Sheet

INK SET AND INK JET RECORDING METHOD

FIELD OF THE INVENTION

An ink set for improved color reproduction is disclosed herein, and in particular, the ink set comprises dark and light inks of the same color that are useful for ink jet printing.

BACKGROUND

Printing systems and methods typically employ three or four color ink sets of cyan, magenta, yellow and optional black inks that together must be able to reproduce accurately many of the visible colors. In ink jet printing, the inks are applied dropwise to a substrate, in a pixel-by-pixel manner, with the number of printed dots corresponding to the density required for a particular imaged area. Thus, an ink jet printer that employs a three or four color ink set prints relatively few dots in low density areas, as compared to high density areas. Image quality is often compromised because in very low density areas, sparsely printed dots of color from three or four color ink sets are noticeable on a white substrate. In addition, highlight areas often lack detail because not enough dots are printed.

In order to improve image quality, ink jet printers may utilize additional "light" inks together with the inks of three or four color ink sets. For example, the most common ink set having light inks is the six color ink set which has light cyan, light magenta, cyan, magenta, yellow, and black inks. Typically, the light inks are the same as the regular inks, sometimes referred to as "dark" inks, except that the light inks have less of the same colorant. More dots in low density areas may be printed with the light inks as compared to the dark inks of regular strength in order to achieve the same density. As a result of printing more dots of lower contrast, image quality is greatly improved.

SUMMARY

The inks of a light/dark pair often comprise the same colorant in different amounts. Sometimes different colorants are used in order to optimize performance properties depending on the particular application. For example, the colorants used in a light/dark pair for photo-quality ink jet printing may be optimized to obtain the best compromise of color accuracy and lightfastness. However, these colorant combinations may not be suitable for printing graphics in which light pinks and deep reds are critical. A magenta ink that is optimized to yield a light pink in a low density area will have too much of a yellow tint to give a deep red. Conversely, a magenta ink optimized to yield a deep red in a high density area will appear too blue or too dull to make a light bright pink.

The ink set disclosed herein comprises: a first ink composition comprising a first colorant, and a second ink composition comprising a second colorant, wherein the first colorant is different from the second colorant; wherein each ink composition, when printed at 100% fill on the same substrate, produces a color having a hue angle, $h°_n$, and a lightness relative to that of the substrate, $\Delta L*_n$, according to:

$$h°_n = \tan^{-1}(b*_n/a*_n)$$

$$\Delta L*_n = L*_{substrate} - L*_n$$

wherein:
n=1 or 2 for the first and second ink compositions, respectively;
$h°_1$ and $h°_2$ differ from each other by no more than 15°; and
$\Delta L*_1 > \Delta L*_2$.

The ink set disclosed herein is useful for accurate color reproduction, especially for reproduction of deep reds and light bright pinks. Also disclosed is an ink jet printing method that employs the ink set and a printed image prepared therefrom.

DETAILED DESCRIPTION

Figure 1:
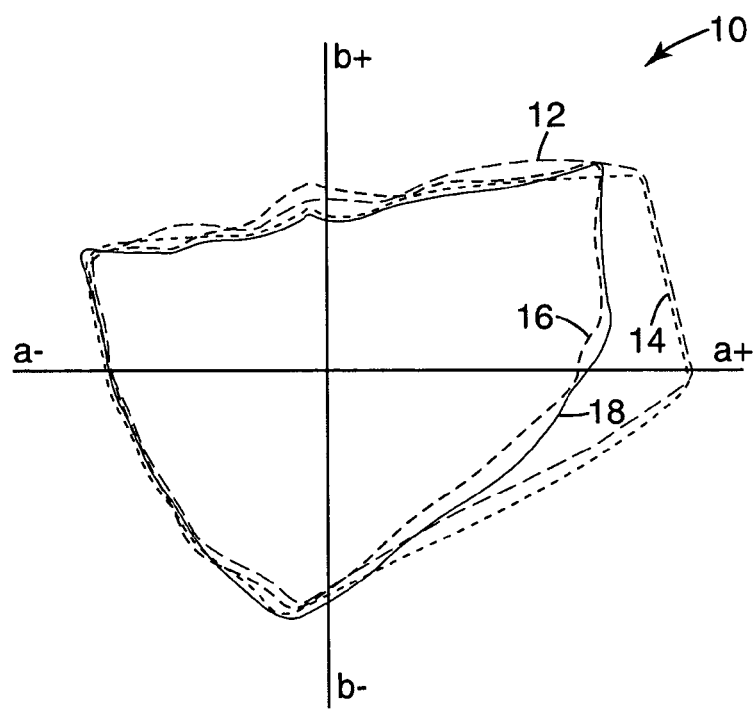
FIG. 1 shows a plot of a* versus b*, at L*=45, for various light/dark ink sets.

The CIE L*a*b* color space, developed by the Commission Internationale de l'Eclairage in 1976, is a widely used method for measuring and ordering color and is used to describe the disclosed ink set. CIELAB color space is a three-dimensional space in which a color is defined as a location in the space using the terms L*, a*, and b*. L* is a measure of the lightness of a color and ranges from zero (black) to 100 (white) and may be visualized as the z-axis of a typical three-dimensional plot having x-, y- and z-axes. The terms a* and b* define the hue and chroma of a color and may be visualized as the x- and y-axes, respectively. The term a* ranges from a negative number (green) to a positive number (red), and the term b* ranges from a negative number (blue) to a positive number (yellow). A color is defined on the x-y plane in terms of its hue angle, h°, and chroma, C*, according to:

$$h° = \tan^{-1}(b*/a*)$$

$$C* = (a*^2 + b*^2)^{1/2}$$

The range of the hue angle, h°, is not uniquely defined and can span any 360 degree range. Commonly this range is chosen to go from 0° to 360°. However, for magenta inks, it is more convenient to use a range of −180° to +180° in order to avoid the discontinuity in hue angle around 0°.

The terms L*, a*, and b* can be used to calculate a volume of color space that a specific set of colorants is capable of producing. This volume is also referred to as color gamut or gamut volume, G, which is calculated by measuring L*, a*, and b* for several hundred printed patches of different color combinations of the inks in the ink set. For example, gamut volumes may be calculated from these measurements using Gamut Works by Monaco. In general, the larger the gamut volume, the more colors a colorant set is capable of producing which results in greater color accuracy. By substituting one colorant for another, one can easily compare how each increases or decreases the gamut volume for a given ink set. For a complete description of color measurement, see "Measuring Color", 2nd Edition by R. W. G. Hunt, published by Ellis Horwood Ltd., 1991.

As used herein, the term "colorant" refers to a single colorant species or a mixture of colorant species at some specific ratio. For example, a colorant can be Pigment Red 122, or a mixture of Pigment Red 122 and Pigment Violet 19 at some specific ratio. As another example, a colorant that is a 2:1 mixture of Pigment Red 122 and Pigment Violet 19 is not the same colorant as a colorant that is a 5:1 mixture of Pigment Red 122 and Pigment Violet 19. In contrast, a colorant is the same colorant if it is the same colorant species or the same mixture of colorant species at the same ratio, even if it is present in different ink compositions at different amounts. For example, a dark ink and a light ink have the same colorant if the dark ink has 5 weight % of a 3:2 mixture of Pigment Blue 15:3 and Pigment Blue 15:1, and the light ink has 2 weight % of a 3:2 mixture of Pigment Blue 15:3 and Pigment Blue 15:1.

The disclosed ink set comprises a first ink composition comprising a first colorant, and a second ink composition comprising a second colorant, wherein the first colorant is different from the second colorant; and wherein each ink composition, when printed at 100% fill on the same substrate, produces a color having a hue angle, $h°_n$, and a lightness relative to that of the substrate, $\Delta L^*_n$, according to:

$$h°_n = \tan^{-1}(b^*_n/a^*_n)$$

$$\Delta L^*_n = L^*_{substrate} - L^*_n$$

wherein n=1 or 2 for the first and second ink compositions, respectively; $h°_1$ and $h°_2$ differ from each other by no more than 15°; and $\Delta L^*_1 > \Delta L^*_2$. Disclosed ink sets provide larger gamut volumes relative to ink sets having a dark and light ink that contain the same colorant. As a result, improved reproduction of light bright pinks and deep reds is possible. In one embodiment, $h°_1$ and $h°_2$ differ from each other by no more than 10°. In another embodiment, $h°_1$ and $h°_2$ differ from each other by no more than 5°.

In one embodiment, the first and second ink compositions are magenta inks, wherein $h°_1$ and $h°_2$ are from −20° to 10°. This hue angle range is generally desirable for magenta inks in order to maximize gamut volume. Furthermore, with such magenta inks, it is possible for $h°_2 \geq h°_1$ which is not possible when the dark and light inks have the same colorant. In one embodiment, the first and second colorants are quinacridones because colorants derived from a quinacridone chromophore generally have good magenta color.

The disclosed ink set may be used in applications in which color reproduction of light bright pinks and deep reds are critical. Typically, a magenta ink that is optimized to yield a light pink in a low density area will have too much of a yellow tint to give a deep red. Conversely, a magenta ink optimized to yield a deep red in a high density area will appear too blue or too dull to make a light bright pink. Use of the disclosed ink set enables design of a light/dark magenta ink set wherein light bright pinks and deep reds can be obtained.

The disclosed ink set may be illustrated by evaluating pink and red reproduction for the dark magenta ink DM-2691 and the light magenta ink LM-2681, wherein both comprise the same magenta quinacridone colorant as described in the Procedures detailed below. The two inks were ink jet printed with dark cyan ink DC-2696, light cyan ink LC-2686, yellow ink Y-2692, and black ink K-2695 as described in the Example section below. Hue angles for printed patches of the magenta record are shown in Table 1.

Reproduction of pink may be qualitatively assessed from the hue angle at 10% fill, and red from the hue angle at 100% fill. For DM-2691 and LM-2681, the hue angle at 10% fill is −18°, and pink appears blueish. The hue angle at 100% fill is about 0° which is an ideal hue angle for magenta; thus, reproduction of deep reds is possible. This is confirmed by visual inspection of the 100% fill for the red record.

TABLE 1

| Fill (%) | DM-2691 + LM-2681 | DM-3917 + LM-3918 | DM-2691 + LM-3918 | DM-3917 + LM-2681 |
|---|---|---|---|---|
| 10 | −17.8 | 2.3 | 1.2 | −14.6 |
| 20 | −17.1 | 2.7 | 0.1 | −13.5 |
| 30 | −16.2 | 3.2 | −0.9 | −12.3 |
| 40 | −15.5 | 3.5 | −1.7 | −11.2 |
| 50 | −14.5 | 4.2 | −2.6 | −9.7 |
| 60 | −13.3 | 5.0 | −3.2 | −7.8 |
| 70 | −11.9 | 5.9 | −3.5 | −5.4 |
| 80 | −9.7 | 7.4 | −3.7 | −2.0 |
| 90 | −6.2 | 9.8 | −3.0 | 3.5 |
| 100 | 0.2 | 14.6 | 0.6 | 14.3 |

The dark magenta ink DM-3917 and the light magenta ink LM-3918 were ink jet printed the same as DM-2691 and LM-2681; both DM-3917 and LM-3918 also comprise the same magenta quinacridone colorant as described in the Example section below, but the magenta colorant is not the same as that of the DM-2691 and LM-2681 ink set. Hue angle measurements are shown in Table 1. The hue angle at 10% fill is 2°, and an ideal bright pink is observed. The hue angle at 100% fill is about 15°, and the magenta appears yellowish. This is confirmed by visual inspection of the 100% fill for the red record which appears as an orange/red shade.

DM-2691 and LM-3918 were ink jet printed the same as DM-2691 and LM-2681, and the hue angles are shown in Table 1. The hue angle at 10% fill is 1°, and an ideal bright pink is observed. The hue angle at 100% fill is also about 1°, and an ideal magenta is observed. This is confirmed by visual inspection of the 100% fill for the red record which appears as a deep red.

DM-3917 and LM-2681 were ink jet printed the same as DM-2691 and LM-2681, and the hue angles are shown in Table 1. The hue angle at 10% fill is −15°, and pink appears blueish. The hue angle at 100% fill is about 14°, and the magenta appears yellowish. This is confirmed by visual inspection of the 100% fill for the red record which appears as an orange/red shade.

The color measurements for the light and dark inks at 100% fill are shown in Table 2. The difference in hue angle, $\Delta h°$, is the absolute value of the difference between $h°_2$ and $h°_1$ measured at 100% fill. For example, from Table 2, if the dark ink is DM-2691 and the light ink is LM-3918, then $\Delta h° = 0°$.

TABLE 2

| Ink | L* | a* | b* | C* | h° |
|---|---|---|---|---|---|
| LM-2681 | 61.9 | 49.4 | −14.5 | 51.5 | −16.4 |
| DM-2691 | 43.3 | 68.5 | 2.1 | 68.5 | 1.8 |
| LM-3918 | 68.7 | 51.8 | 1.6 | 51.9 | 1.8 |
| DM-3917 | 57.7 | 65.7 | 16.2 | 67.7 | 13.9 |

The $\Delta h°$ values for all four dark/light ink combinations are shown in Table 3. The ink set of DM-2691 and LM-3918 is best able to reproduce light bright pinks and deep reds. This finding is further demonstrated by comparing the gamut volume, G, for each of the ink sets, as determined according to the description in the Example section. The results are shown in Table 3.

TABLE 3

| Dark Ink | h° (deg) | Light Ink | h° (deg) | Δh° (deg) | G | ΔL*$_2$/ΔL*$_1$ |
|---|---|---|---|---|---|---|
| 2691 | 1.8 | 2681 | −16.4 | 18.2 | 572,735 | 63.8 |
| 2691 | 1.8 | 3918 | 1.8 | 0.0 | 618,411 | 50.6 |
| 3917 | 13.9 | 2681 | −16.4 | 30.2 | 556,896 | 88.6 |
| 3917 | 13.9 | 3918 | 1.8 | 12.1 | 597,266 | 70.3 |

The data in Table 3 show that:

The largest gamut volume was obtained for the ink set comprising DM-2691 and LM-3918, which is the same ink set that is able to reproduce light bright pinks and deep reds.

The largest gamut volume was obtained when different magenta colorants were used for the light and dark magenta inks.

The largest gamut volume was obtained when the different colorants chosen for the light and dark inks were such that the hue angle difference between patches printed at 100% fill were the smallest. That is, the DM-2691 and LM-3918 ink set (Δh°=0°) yielded a larger gamut volume than the combination of DM-3917 and LM-2681 (Δh°=30°).

The invention may be illustrated by comparing color spaces for the various ink sets. FIG. 1 shows a plot of a* versus b* 10, at L*=45, which represents a slice of the color space for deep reds. Ink sets DM-2691+LM-3918 12 and DM-2691+LM-2681 14 have larger areas as compared to ink sets DM-3917+LM-3918 16 and DM-3917+LM-2681 18. Ink sets 12 and 14 can reproduce deeper reds better than ink sets 16 and 18.

Figure 2:
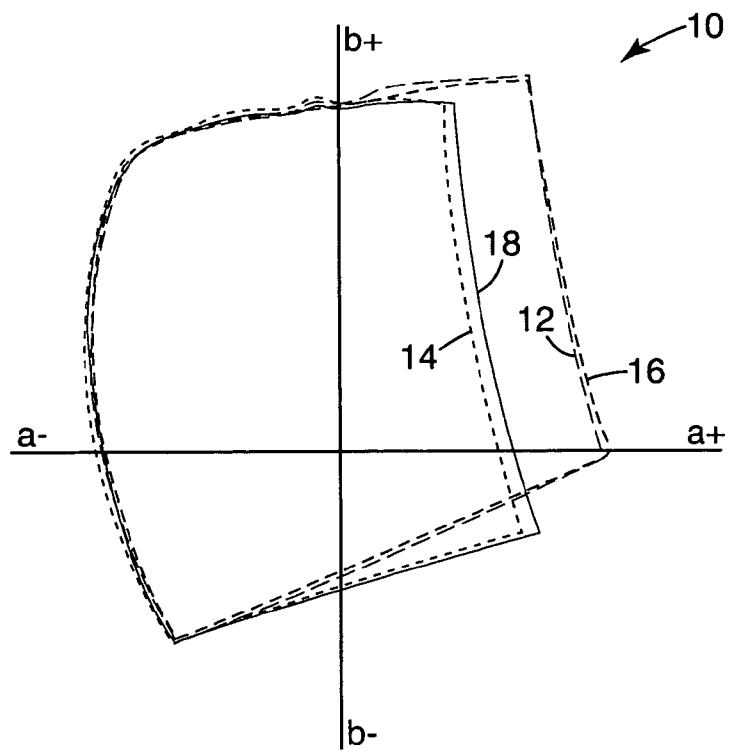
FIG. 2 shows a plot of a* versus b*, at L*=70, for various light/dark ink sets.

FIG. 2 shows a plot of a* versus b* 10, at L*=70, which represents a slice of the color space for light bright pinks. Ink sets DM-2691+LM-3918 12 and DM-3917+LM-3918 16 have larger areas as compared to ink sets DM-2691+LM-2681 14 and DM-3917+LM-2681 18. Ink sets 12 and 16 can reproduce light bright pinks better than ink sets 14 and 18. Thus, ink set 12 is best able to produce light bright pinks and deep reds.

Use of the disclosed ink set is not limited to dark/light magenta ink sets wherein light bright pinks and deep reds are desired. The disclosed ink set may also be used for dark and light cyan inks in which light bright cyans and deep blues are desired. In a similar manner, it would be advantageous for a light cyan ink to contain more of a red shade cyan colorant and less of a green shade colorant than the dark cyan ink because the hue angle of a cyan ink increases as the the pigment concentration and/or printed area coverage increases. In one embodiment, the first and second ink compositions are cyan inks, wherein h°$_1$ and h°$_2$ are from 225° to 245°. In another embodiment, the first and second ink compositions are cyan inks, wherein h°$_1$ and h°$_2$ are from 225° to 245° and h°$_2 \geq$ h°$_1$.

The disclosed ink set may also be used for dark and light yellow inks in which light bright yellows and deep greens are desired. For example, it would be advantageous for a light yellow ink to contain more of a red shade yellow pigment and less of a green shade yellow pigment than the dark yellow ink because the hue angle of a yellow ink decreases as the pigment concentration and/or printed area coverage increases. In one embodiment, the first and second ink compositions are yellow inks, wherein h°$_1$ and h°$_2$ are from 80° to 100°. In another embodiment, the first and second ink compositions are yellow inks, wherein h°$_1$ and h°$_2$ are from 80° to 100° and h°$_2 \leq$ h°$_1$.

ΔL* is defined as the difference between the measured L* of the substrate and the measured L* of the ink printed at 100% fill. A typical white substrate has an approximate L* value of 94.7. Using this value for the L* of the substrate, the values of the ratio of ΔL*$_2$ to ΔL*$_1$ were calculated and are shown in Table 3. By definition, ΔL*$_2$ is less than ΔL*$_1$. In one embodiment, ΔL*$_2$ is less than 80% of ΔL*$_1$ in order to reduce graininess. In another embodiment, ΔL*$_2$ is from 30 to 70% of ΔL*$_1$. In yet another embodiment, ΔL*$_2$ is from 40 to 60% of ΔL*$_1$. The narrowest range is advantageous because as ΔL*$_2$ is changed from being less than 80% of ΔL*$_1$ to within 40 to 60% of ΔL*$_1$, the graininess of an image printed with these inks is reduced.

The first and second ink compositions of the inventive ink set may be ink jet ink compositions, and they may be any type known in the art of ink jet printing. For example, the first and second ink compositions may be radiation-curable ink compositions that are curable using actinic or thermal radiation. Particularly useful radiation-curable ink compositions are described in US 2002/0086914 A1, the disclosure of which is incorporated herein by reference. The first and second ink compositions may also be solvent-based ink compositions, wherein each solvent-based ink composition comprises at least 30 weight % of an organic solvent relative to the total weight of the ink composition. Examples of useful organic solvents are methyl ethyl ketone and isopropanol. The first and second ink compositions may be aqueous-based ink compositions, wherein each aqueous-based ink composition comprises at least 30 weight % of water relative to the total weight of the ink composition.

The first and second colorants of the inventive ink set may be any type known in the art of ink jet printing. The first and second colorants may be pigments, dyes, or combinations thereof. For example, the first colorant comprises a first pigment and a second pigment, wherein the first pigment and the second pigment are at a first weight ratio; the second colorant comprises the first pigment and the second pigment, wherein the first pigment and the second pigment are at a second weight ratio; and the first weight ratio differs from the second weight ratio.

For another example, the first colorant comprises a first dye and a second dye, wherein the first dye and the second dye are at a first weight ratio; the second colorant comprises the first dye and the second dye, wherein the first dye and the second dye are at a second weight ratio; and the first weight ratio differs from the second weight ratio.

For yet another example, the first colorant comprises a pigment and a dye at a first weight ratio; the second colorant comprises the pigment and the dye at a second weight ratio; and the first weight ratio differs from the second weight ratio.

The disclosed ink set may be used in any type of printing system such as an ink jet printer. The ink jet printer may be a desktop or a wide format printer, and it may be equipped with any type of ink jet printhead such as a piezo, thermal, continuous, or acoustic printhead, or it may be equipped with any device that can produce a small number of drops, e.g. a single drop or up to 16 drops, per signal. The disclosed ink set provides an ink jet printing method comprising:

(a) providing an ink set comprising:

a first ink composition comprising a first colorant, and a second ink composition comprising a second colorant, wherein the first colorant is different from the second colorant;

wherein each ink composition, when printed at 100% fill on the same substrate, produces a color having a hue angle, $h°_n$, and a lightness relative to that of the substrate, $\Delta L*_n$, according to:

$$h°_n = \tan^{-1}(b*_n/a*_n)$$

$$\Delta L*_n = L*_{substrate} - L*_n$$

wherein:
 n=1 or 2 for the first and second ink compositions, respectively;
 $h°_1$ and $h°_2$ differ from each other by no more than 15°; and
 $\Delta L*_1 > \Delta L*_2$; and
(b) printing the ink set by means of an ink jet printhead.

In one embodiment, the first and second ink compositions used in the printing method are magenta inks, wherein $h°_1$ and $h°_2$ are from −20° to 10°.

The disclosed ink set also provides a printed image prepared using the ink jet printing method described above. In one embodiment, the first and second ink compositions used to prepare the printed image are magenta inks, wherein $h°_1$ and $h°_2$ are from −20° to 10°. The printed image may comprise any suitable substrate known in the art of ink jet printing. Examples of useful substrates include vinyl, paper, plastics, etc.

The examples described herein are presented for illustration purposes only and are not intended to limit the scope of the invention in any way.

PROCEDURES

Ink Jet Ink Compositions

The example employs radiation curable ink compositions as shown in Table 4.

TABLE 4

| Ink | Description |
| --- | --- |
| DM-2691 | 3M ™ Series 2600 Dark Magenta Ink |
| LM-2681 | 3M ™ Series 2600 Light Magenta Ink |
| DM-3917 | VUTEk ® Gen III Dark Magenta Ink P3917-A |
| LM-3918 | VUTEk ® Gen III Light Magenta Ink P3918-A |
| DC-2696 | 3M ™ Series 2600 Dark Cyan Ink |
| LC-2686 | 3M ™ Series 2600 Light Cyan Ink |
| Y-2692 | 3M ™ Series 2600 Yellow Ink |
| K-2695 | 3M ™ Series 2600 Black Ink |

Ink Jet Printing

Ink jet printing was carried out using a 3M™ Printer 2500UV for Scotchprint® Graphics, which is a UV-curable, high-productivity piezo ink jet printing system. The following conditions were employed:
 3 pass
 10 kHz firing frequency
 20 inches of left and right overtravel
 12 arrays
 unidirectional from left to right
 both UV lamps on high power The images printed were calibration6color.eps, CMYK_test_file.eps, and PrintopenXT_CMYK.tif; all of which are included in 3M™ Scotchprint® GraphicMaker Software. The calibration6color.eps file was ripped using the GraphicMaker software and the following settings:
 423 dpi by 600 dpi resolution
 test chart mode
 light ink maximum at 100%
 no profile
 spot size of 4

The ripped file was then printed onto 3M™ Controltac™ Plus IJ180C-10 vinyl and the status T cyan, magenta, yellow and black densities of the fill level patches were read using an X-Rite 528 Spectrodensitometer into the Printcal Editor portion of the GraphicMaker software in order to construction a calibration ramp for the printer. The ripped calibration6color file was also printed with the light magenta and light cyan inks disabled so that the status T densities and L*a*b* colors of the dark inks alone at various fill levels could be measured. The hue angles of the printed patches for the magenta records are shown in Table 1.

The CYMK_test_file.eps and PrintopenXT_CMYK.tif files were then ripped using the above calibration file at resolution of 423 by 600 dpi, with the light ink maximum set at 100% and no profile. The ripped files were printed and the printed PrintopenXT_CMYK file was used to generate an ICC profile for each ink set. The resultant profile was used to compare the gamut volumes and therefore the colors accessible by each of the ink sets. The gamut volumes were calculated using Gamut Works by Monaco and can be found in Table 3.

What is claimed is:

1. An ink set comprising:
 a first ink composition comprising a first colorant, and a second ink composition comprising a second colorant, wherein the first colorant is different from the second colorant;
 wherein each ink composition, when printed at 100% fill on the same substrate, produces a color having a hue angle, $h°_n$, and a lightness relative to that of the substrate, $\Delta L*_n$, according to:

$$h°_n = \tan^{-1}(b*_n/a*_n)$$

$$\Delta L*_n = L*_{substrate} - L*_n$$

wherein:
 n=1 or 2 for the first and second ink compositions, respectively;
 $h°_1$ and $h°_2$ differ from each other by no more than 15°; and
 $\Delta L*_1 > \Delta L*_2$.

2. The ink set according to claim 1, wherein the first and second ink compositions are ink jet ink compositions.

3. The ink set according to claim 2, wherein $h°_1$ and $h°_2$ differ from each other by no more than 10°.

4. The ink set according to claim 2, wherein $h°_1$ and $h°_2$ differ from each other by no more than 5°.

5. The ink set according to claim 2, wherein $h°_1$ and $h°_2$ are from −20° to 10°.

6. The ink set according to claim 5, wherein the first and second colorants are quinacridones.

7. The ink set according to claim 5, wherein $h°_2 \geq h°_1$.

8. The ink set according to claim 2, wherein $h°_1$ and $h°_2$ are from 225° to 245°.

9. The ink set according to claim 8, wherein $h°_2 \geq h°_1$.

10. The ink set according to claim 2, wherein $h°_1$ and $h°_2$ are from 80° to 100°.

11. The ink set according to claim 10, wherein $h°_2 \leq h°_1$.

12. The ink set according to claim 2, wherein $\Delta L*_2$ is less than 80% of $\Delta L*_1$.

13. The ink set according to claim 2, wherein $\Delta L*_2$ is from 30 to 70% of $\Delta L*_1$.

14. The ink set according to claim 2, wherein $\Delta L*_2$ is from 40 to 60% of $\Delta L*_1$.

15. The ink set according to claim 2, wherein the first and second ink compositions are radiation-curable ink compositions that are curable using actinic or thermal radiation.

16. The ink set according to claim 2, wherein the first and second ink compositions are solvent-based ink compositions, wherein each solvent-based ink composition comprises at least 30 weight % of an organic solvent relative to the total weight of the ink composition.

17. The ink set according to claim 2, wherein the first and second ink compositions are aqueous-based ink compositions, wherein each aqueous-based ink composition comprises at least 30 weight % of water relative to the total weight of the ink composition.

18. The ink set according to claim 2, wherein the first and second colorants are pigments, dyes, or combinations thereof.

19. The ink set according to claim 18, wherein:
the first colorant comprises a first pigment and a second pigment, wherein the first pigment and the second pigment are at a first weight ratio;
the second colorant comprises the first pigment and the second pigment, wherein the first pigment and the second pigment are at a second weight ratio; and
the first weight ratio differs from the second weight ratio.

20. The ink set according to claim 18, wherein:
the first colorant comprises a first dye and a second dye, wherein the first dye and the second dye are at a first weight ratio;
the second colorant comprises the first dye and the second dye, wherein the first dye and the second dye are at a second weight ratio; and
the first weight ratio differs from the second weight ratio.

21. The ink set according to claim 18, wherein:
the first colorant comprises a pigment and a dye at a first weight ratio;
the second colorant comprises the pigment and the dye at a second weight ratio; and
the first weight ratio differs from the second weight ratio.

22. An ink jet printing method comprising:
(a) providing an ink set comprising:
a first ink composition comprising a first colorant, and a second ink composition comprising a second colorant, wherein the first colorant is different from the second colorant;
wherein each ink composition, when printed at 100% fill on the same substrate, produces a color having a hue angle, $h°_n$, and a lightness relative to that of the substrate, $\Delta L^*_n$, according to:

$$h°_n = \tan^{-1}(b^*_n/a^*_n)$$

$$\Delta L^*_n = L^*_{substrate} - L^*_n$$

wherein:
n=1 or 2 for the first and second ink compositions, respectively;
$h°_1$ and $h°_2$ differ from each other by no more than 150; and
$\Delta L^*_1 > \Delta L^*_2$; and
(b) printing the ink set by means of an ink jet printhead.

23. The printing method of claim 22, wherein $h°_1$ and $h°_2$ are from −20° to 10°.

24. A printed image prepared using the ink jet printing method of claim 22.

25. The printed image of claim 24, wherein $h°_1$ and $h°_2$ are from −20° to 10°.

* * * * *

UNITED STATES PATENT AND TRADEMARK OFFICE
CERTIFICATE OF CORRECTION

PATENT NO. : 7,341,621 B2 Page 1 of 1
APPLICATION NO. : 11/076885
DATED : March 11, 2008
INVENTOR(S) : Bruce A. Nerad It is certified that error appears in the above-identified patent and that said Letters Patent is hereby corrected as shown below:

Column 10,
Line 23 (approx.), In Claim 22, delete "150;" and insert -- 15°; --, therefor.

Signed and Sealed this

Twelfth Day of August, 2008

JON W. DUDAS
*Director of the United States Patent and Trademark Office*